Nov. 24, 1925.

W. G. ELLIS 1,562,877

RADIO RECEIVING SYSTEM

Filed June 16, 1922

Inventor
William G. Ellis
By
Attorney

Patented Nov. 24, 1925.

1,562,877

UNITED STATES PATENT OFFICE.

WILLIAM G. ELLIS, OF PHILADELPHIA, PENNSYLVANIA.

RADIO RECEIVING SYSTEM.

Application filed June 16, 1922. Serial No. 568,827.

*To all whom it may concern:*

Be it known that I, WILLIAM G. ELLIS, a citizen of the United States of America, and resident of Philadelphia, county of Philadelphia, State of Pennsylvania, have invented certain new and useful Improvements in Radio Receiving Systems, of which the following is a specification.

My invention relates generally to radio receiving systems, but more specifically to those employing loop or coil reception.

An object of my invention is to improve the null or minimum point of reception in receiving circuits employing loop or coil receptors, thereby reducing or eliminating interference at this point.

A particular object is to improve the accuracy of loop radio direction finders or radiocompasses employing the null or minimum point of reception as an indication of the direction or bearing of the transmitting station.

Some of the causes for blurred minima in loop receptors are discussed in the Journal of the Franklin Institute, volume 188, beginning page 326, and a suggested method of compensating for the so-called "antenna effect" appears in Figure 52, on page 338 of that publication. While the compensator suggested improves the minimum, I have found that the compensation obtained is not sufficiently complete to meet the demands for accuracy now required of radiocompass stations furnishing bearings to navigators, or to permit of the desired successful avoidance of interference at receiving stations employing loop receptors so orientated as to bring interfering stations on the bearing of minimum signal reception. It is the purpose of my invention to further improve the compensation of the so-called "antenna effect" and other currents in quadrature or otherwise dephased from the pure loop reception currents, as hereinafter explained.

Figures 1 to 5 inclusive show various ways of employing my invention, Figure 1 being the usual and preferred form. Fig. 6 is a diagrammatic explanation of my invention.

Referring to Figure 1, 1 represents a loop receptor of one or more turns having tuning condenser C in series, one terminal of which is connected to grid G of a three-electrode vacuum tube detector V and the other terminal connected to filament F of the same tube, the battery A, the telephones or other responsive device T, the battery B and plate P. It will therefore be seen that the first terminal is connected to a small element having negligible capacity to ground while the second terminal is connected to a number of elements having substantial capacity to ground, particularly the battery A, which in ordinary practice is a three-cell, sixty ampere-hour storage battery. This capacity is represented by $C_2$ in Fig. 6, and the past practice has been to compensate for this capacity $C_2$ by introducing a variable condenser $C_1$ in a connection to ground, and adjusting its capacity to that of $C_2$. But this capacity $C_2$ is not pure, as every condenser has a phase angle or resistance factor, which may be represented by $R_2$ in Fig 6. It is therefore necessary to introduce a resistance R in connection with condenser $C_1$ to get complete balance or compensation. This resistance should be variable for adjusting purposes, as moving the batteries and other elements, and other variable conditions, will alter the values of $C_2$ and $R_2$. Switch S permits of connecting the line containing variable elements $C_1$ and R to the desired terminal of condenser C.

In addition to the unsymmetrical or unbalanced condition which may arise from connecting one terminal of the condenser C to elements having greater leakage path to ground than do the connections to the other terminal, it is apparent that in loop installations in the vicinity of metallic structures other influences introduce quadrature current effects in the system. For instance, the wave reradiated from metallic structures naturally has encountered some loss of energy, and therefore has a greater decrement than the direct wave, and it is evident that two waves having dissimilar envelopes do not balance of themselves. The adjustable resistance in connection with the reactive element also permits of obtaining an adjustment for this condition of affairs.

In Figs. 2 to 5 inclusive, I have represented the detector diagrammatically by D.

Figure 1:
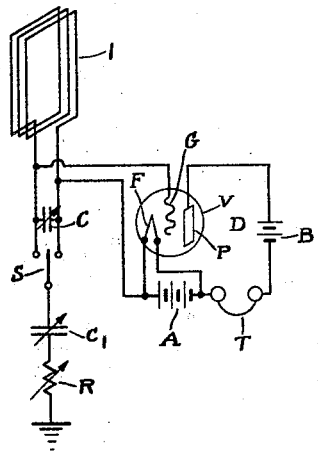
Figure 2:
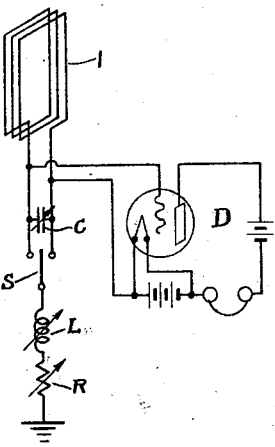
Fig. 2 shows the resistance element used in connection with an inductive compensating reactance L, which would be the procedure in case the unbalance is caused by an inductive unsymmetrical or unbalanced grounding through the detector.
Figure 3:
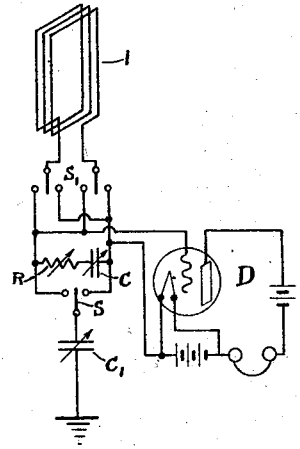
Fig. 3 shows the resistance element directly in the loop, with switch $S_1$ arranged to permit of inverting the detector connections. This is the preferred arrangement when correcting an unbalance mainly due to reradiation, hereinbefore described.
Figure 4:
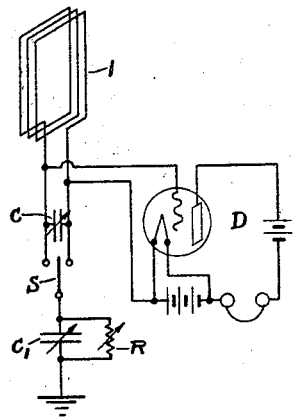
Fig. 4 shows the compensating resistance element in parallel with the compensating reactance element. The reactance element may be either capacity or inductance.
Figure 5:
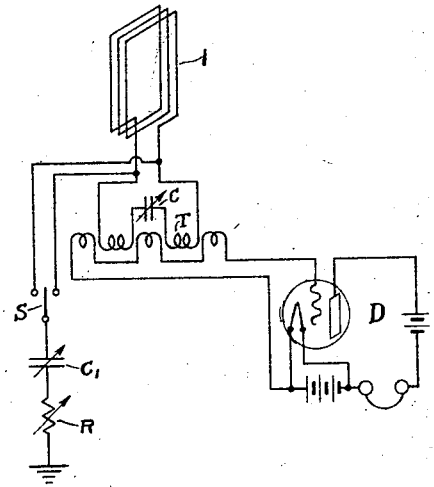
Fig. 5 shows the compensating resistance element employed in connection with the so-called "compensating transformer", represented by T, arrangement.
Figure 6:
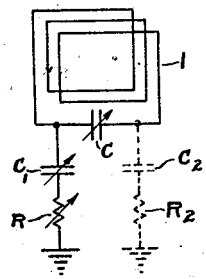

While I have illustrated the usual and preferred form of employing my invention, and a number of modifications thereof, I do not wish to be limited thereby, as other modifications will be readily apparent to those skilled in the art.

Having fully described my invention, what I desire to secure by Letters Patent is:

1. In a radio receiving system the combination of a loop or receptor, a tuning element therein, a detector connected to points of different potential of said tuning element, said detector being of a nature to create unbalanced electrical paths to ground from said points, and a compensating circuit including a resistance to compensate for said unbalanced grounding.

2. In a radio receiving system the combination of a loop receptor, a tuning element therein, a detector connected to points of different potential of said tuning element, said detector being of a nature to create unbalanced electrical paths to ground from said points, and compensating circuit including a resistance and a reactance element to compensate for said unbalanced grounding.

3. A radio receiving system including a loop receptor, a tuning element in said loop, a detector connected to opposite sides of said element, said detector being of a nature to create unbalanced electrical paths to ground from said opposite connections, and a compensating circuit including a resistance connecting one of said sides to ground.

4. A radio receiving system including a loop receptor, a tuning element in said loop, a detector connected to opposite sides of said element, said detector being of a nature to create unbalanced electrical paths to ground from said opposite connections, and a compensating circuit including a resistance and a reactance element connecting one of said sides to ground.

WILLIAM G. ELLIS.